United States Patent
Byun et al.

(10) Patent No.: US 7,079,600 B2
(45) Date of Patent: Jul. 18, 2006

(54) FSK DEMODULATOR USING DLL AND A DEMODULATING METHOD

(75) Inventors: Sang Jin Byun, Daejeon (KR); Beomsup Kim, Cupertino (KR); Chan-Hong Park, Seoul (KR)

(73) Assignee: Qualcomm Incorporated, San Diego, CA (US)

( * ) Notice: Subject to any disclaimer, the term of this patent is extended or adjusted under 35 U.S.C. 154(b) by 339 days.

(21) Appl. No.: 10/438,297

(22) Filed: May 13, 2003

(65) Prior Publication Data

US 2004/0008755 A1    Jan. 15, 2004

Related U.S. Application Data

(63) Continuation of application No. 10/259,202, filed on Sep. 27, 2002, now abandoned.

(30) Foreign Application Priority Data

Sep. 29, 2001    (KR) ...................... 10-2001-0061046

(51) Int. Cl.
    *H03D 3/00*    (2006.01)
(52) U.S. Cl. ...................... 375/334; 375/272; 375/376; 329/300; 455/130
(58) Field of Classification Search ................ 375/334, 375/272, 376, 336; 329/300; 332/100; 455/130
    See application file for complete search history.

(56) References Cited

U.S. PATENT DOCUMENTS 4,804,925 A * 2/1989 Iwase et al. ................. 329/310
5,053,717 A * 10/1991 Schulz et al. ............... 329/300

OTHER PUBLICATIONS

Ajjikuttira, et al, "A Fully-Integrated CMOS RFIC for Bluetooth Applications" 2001 IEEE International Solid-State Circuits Conference, Session 13, Wireless LAN/13.2, pp. 198-199, 446.
Komurasaki, et al, "A Single-Chip 2.4 GHz RF Transceiver LSI with a Wide-Range FV Conversion Demodulator", ISSCC, Feb. 2001, Session 13, Wireless LAN/13.6, pp. 206, 207, 448.

* cited by examiner

Primary Examiner—Temesghen Ghebretinsae
(74) Attorney, Agent, or Firm—Philip Wadsworth; Charles D. Brown; Kenyon S. Jenckes (57) ABSTRACT

A system and method are disclosed for providing a FSK demodulator using DLL and a demodulating method which detects a time order of the rising edges of square waves that correspond to two modulation frequencies and an in-between frequency and demodulates the relevant frequencies into data. The FSK demodulator includes a band-pass filter, an amplitude limiter for converting a waveform of the frequency filtered into a square wave, a delay line for receiving the square wave from the amplitude limiter and delaying the square wave for a delay time, a delayed flip-flop (DFF) for receiving an output signal from the amplitude limiter and an output signal from the delay line, determining which rising edge of the two input signals is earlier at a given time, and outputting the result of the determination as data, and a DLL circuit that locks the delay time of the delay line.

16 Claims, 9 Drawing Sheets

FSK DEMODULATOR USING DLL AND A DEMODULATING METHOD

CROSS REFERENCE TO RELATED APPLICATIONS

This application is a continuation of U.S. patent application Ser. No. 10/259,202, entitled "FSK DEMODULATOR USING DLL AND A DEMODULATING METHOD" filed Sep. 27, 2002 now abandoned, which is incorporated herein by reference for all purposes, which claims priority to Republic of Korea Patent Application No. 10-2001-0061046, filed Sep. 29, 2001, which is incorporated herein by reference for all purposes.

FIELD OF THE INVENTION

The present invention relates generally to frequency shift keying (FSK) demodulation. More specifically, a technique for FSK demodulation using DLL and a demodulating method is disclosed.

BACKGROUND OF THE INVENTION

Frequency shift keying ("FSK") demodulation is a conventional technique used in communications technologies to modulate the frequency of a signal in order to transmit or send data. By modulating the frequency of a communication signal, a communications signal can be used to transmit data, often in the form of binary data using various types of communications networks, analog, POTS, etc. In general, there are particular requirements for communications processors using FSK demodulation.

The performance of a FSK demodulator integrated on an IC requires stability, particularly with regard to the bit error rate ("BER"), which must be stable during changes in time, process, and temperature. A FSK demodulator must also eliminate any DC voltage offset in a demodulator unit created by precision errors and errors in the frequency synthesizer bit rate. These errors can occur consistently at the beginning or in the middle of data reception. Elimination of errors resulting from non-ideal reception paths for the FSK receiver is another purpose for using FSK demodulators. In addition, a wireless FSK demodulator also maintains power requirements which are distinct from other conventional FSK demodulators. Specifically, lower power consumption rates are desired and power requirements should be suitable for the data rate of the FSK modulation signal that is to be demodulated, index modulation, and intermediate frequency (IF) of the demodulator.

Figure 1:
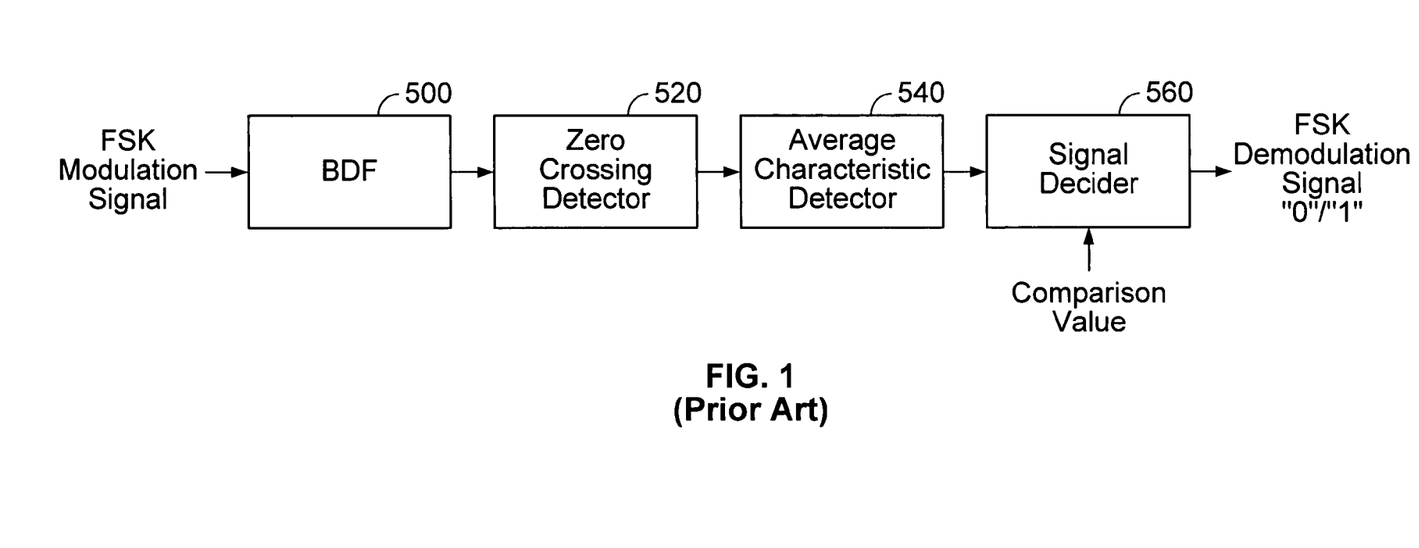
FIG. 1 illustrates a conventional demodulating circuit.

FIG. 1 illustrates a conventional demodulating circuit, including a band-pass filter, a zero crossing detector, an average characteristic detector, and a signal decider, which counts the number of zero crossing points. Counting the number of zero crossing points is based on whether the number of higher frequency FSK demodulation signal zero crossings is greater than the number of lower frequency zero crossings. For an FSK demodulation method, the number of zero crossing points is also based on the change in the zero crossing count.

Figure 2:
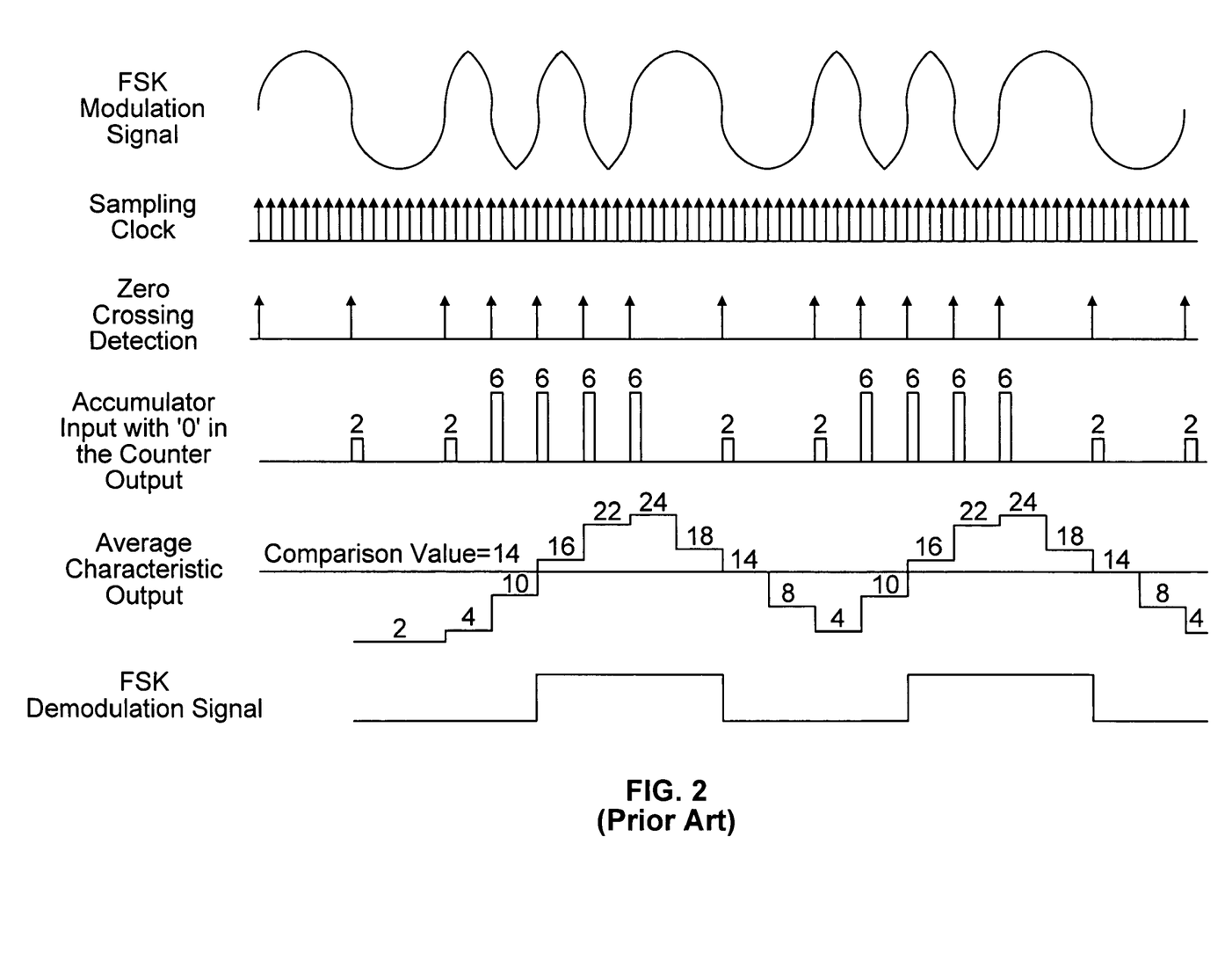
FIG. 2 is a diagram illustrating a conventional demodulating method.

FIG. 2 is a diagram illustrating a conventional demodulating method wherein a zero crossing can be counted using a sampling clock that is much faster than the IF frequency. A problem with this method is the requirement for a very high sampling clock if an IF frequency is high and the modulation index is small. For example, if an IF frequency is 3 MHz, the data rate is 1 Mbps, and the modulation index is 0.3, the two FSK frequencies to be demodulated by the zero crossing detector are 2.85 MHz and 3.15 MHz, which require a sampling frequency several times higher than 30 MHz.

Figure 3:
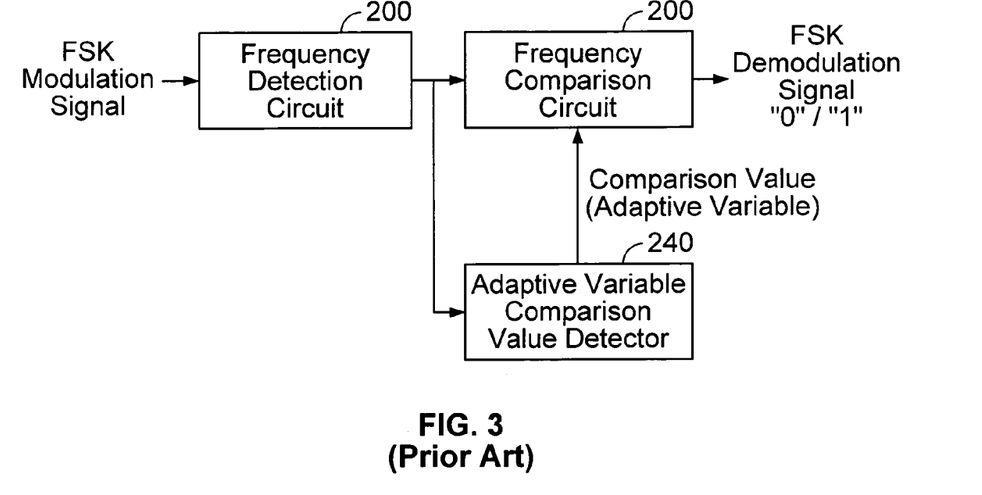
FIG. 3 is a block diagram of a conventional FSK demodulation circuit.
Figure 4:
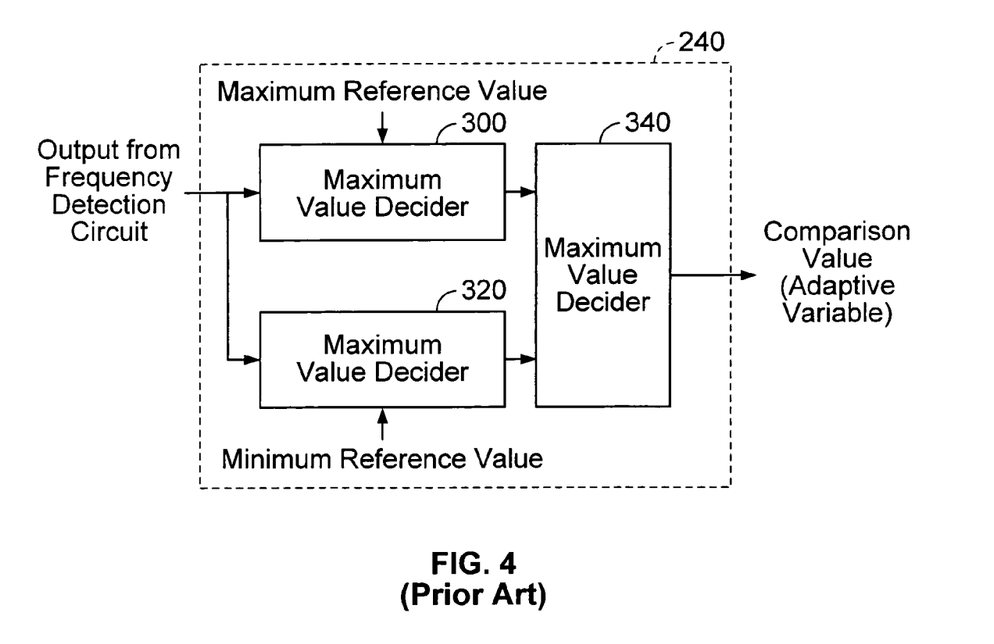
FIG. 4 is a block diagram of a conventional DC offset remover, which uses an adaptive method for a comparative value that is used as a reference in the signal decider of FIG. 1.

FIG. 3 is a block diagram of a conventional FSK demodulation circuit. FIG. 4 is a block diagram of a conventional DC offset remover, which uses an adaptive method for a comparative value that is used as a reference in the signal decider of FIG. 1. The comparative value is the average of the maximum and the minimum output of the said average characteristic detector of FIG. 1.

Figure 5:
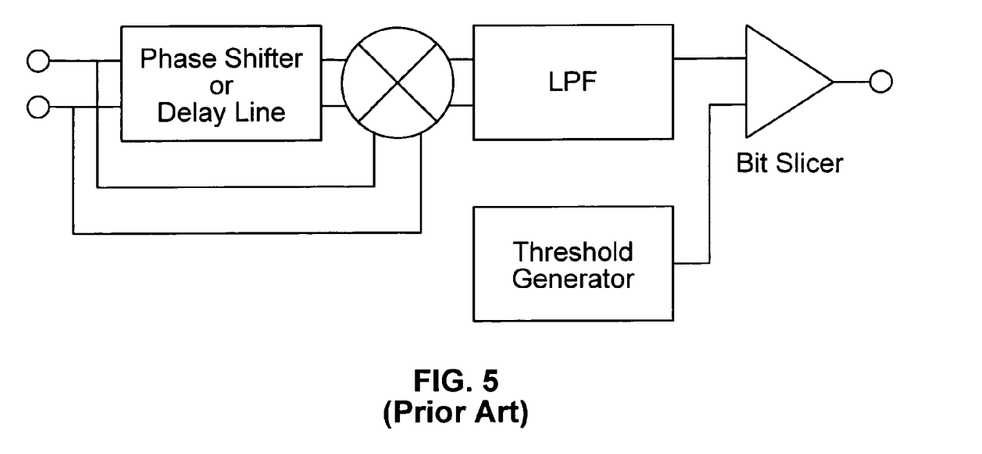
FIG. 5 illustrates an IC for implementing a conventional FSK demodulation method.

FIG. 5 illustrates an IC for implementing a conventional FSK demodulation method. As illustrated, a bit slice method is used whereby a signal from an amplitude limiter is multiplied by a signal that passes through a 90 degrees phase shifter or a T/4 delay line. The signal then passes through a low pass filter (LPF), and is compared with a threshold voltage. However, there are problems associated with designing a reliable phase shifter using the IC of FIG. 5. If the modulation index is small, one disadvantage in IC design using the IC of FIG. 5 is the requirement for a phase shifter of high Q value because the distance between the two frequencies of the FSK modulation signal intended for demodulation is close. If a delay line is used that has a delay time of T/4, the phase shift is also problematic with regard to the output signal of the multiplier. Specifically, if a delay time of T/4 is used, the phase shifter may require an LPF of high attenuation ratio because of the relatively high harmonics in the output signal of the multiplier.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A system and method for an FSK demodulator using a Delay Locked Loop (DLL) and a demodulating method are disclosed. Embodiments of the present invention disclose a FSK demodulator using DLL and a demodulating method, which, based on the fact that the periods of two FSK modulation frequencies are not similar, detects the time order of rising edges of square waves that correspond to two modulation frequencies and an in-between frequency and demodulates relevant frequencies into digital data in accordance with the detection result.

An exemplary FSK demodulator using DLL and a demodulating method resolves problems in conventional FSK demodulating techniques and provides for improved performance of a demodulator which is integrated with an IC and removes the DC offset.

In general, a FSK demodulator using DLL may include a delay line that receives a FSK modulation frequency after converting the frequency into a square wave through an amplitude limiter, thus delaying the input square wave for a set time in the device for demodulating the square wave into digital data. The FSK demodulator may also compare the time order of the rising edges of the input square wave and the delayed square wave at a given time and outputs digital data corresponding to the comparison result as demodulated data.

The delay line includes a DLL circuit that includes a first delayer that delays and outputs the input reference clock signal, a phase detector that detects phases of an output clock from the first delayer, a reference clock for comparing input reference and output clock signals, and a charge pump that charges/discharges a capacitor in accordance with the output of the phase detector. The charged voltage of the capacitor provides a signal for controlling the delay time in the first delayer so that the delay time is locked to the period of the reference clock. A second delayer is also provided that delays the output of the input square wave by as much as the delay time locked in the first delayer.

In another embodiment, the FSK demodulator using DLL includes a delay locked loop that is composed of a delayer that receives the FSK modulation frequency after converting it into a square wave through the amplitude limiter. The delayer, which is composed of several delay cells connected in series, delays the output of an input reference clock in the demodulator which demodulates the square wave into digital data. A phase detector detects the phase difference between an output clock of the delayer and the input reference clock, and a delay controller that provides a delay time control signal generated on the basis of the detected phase difference. The delay time control signal ensures that the output clock of the delayer is locked to the period of the input reference clock.

A delay line is also provided which includes several delay cells connected in series and delays the output of the input square wave by as much as the delay time determined by the delay control signal output from the delay controller. Also included in the present embodiment is a primary decider which is composed of additional deciders, each of which corresponds to a delay cell. The primary decider determines the order of the rising edges of the input square wave reference and the output clock of each of the delay cells. The order is determined by using each of the deciders, and the primary decider outputs digital data generated in accordance with the result of such decision. Also included is an output module which, on the basis of digital data output from the deciders, selects the decider that is outputting digital data corresponding to a maximum or minimum frequency of the input square wave. The output module then selects the decider that outputs digital data corresponding to the mean of the maximum and minimum frequencies. The selected decider is designated as a demodulation decider for demodulating the input square wave and outputs demodulation data.

In the above embodiment, the output module includes a DC offset remover that, based on the bit pattern over-sampled N (where N=2 or a larger integer) times the demodulation data output above, decides the generation of DC offset. When a DC offset is generated, the output module selects a decider as the new demodulation decider so that the DC offset is removed.

In an embodiment of the present invention, a FSK demodulating method using DLL includes several steps. In the first step, the FSK demodulator provides for delaying the input square wave for a set time in the method during which it receives a FSK modulation frequency and converts it into an input square wave. After converting the FSL modulation frequency into an input square wave, the input is passed through an amplitude limiter and the input square wave is demodulated into digital data. The FSK demodulator outputs the input square wave as digital data, based on evaluating the order of rising edges of the input square wave and the delayed square wave.

In accordance with another embodiment of the present invention, a FSK demodulating method using DLL includes receiving a FSK modulation frequency after converting it into a square wave using an amplitude limiter and demodulating the input square wave into digital data. Demodulating the square waves includes several stages.

In stage 1, the output of the input square wave is delayed in sequence over several steps by a set delay time. Next, in stage 2, the order of the rising edges of the input square wave and the square waves delayed is decided at a given time and the result of such decision is output as digital data, in each step of the above-described demodulating method. The FSK demodulator, in stage 3, uses the output digital data, correlates the digital data to a corresponding maximum or minimum frequency of the input square wave, and outputs the results of the correlation. The FSK demodulator selects the step of the above-described demodulating method that outputs digital data which corresponds to the mean of the maximum and minimum and identifies the selected step as the demodulation step for demodulating the input square wave. The FSK demodulator outputs digital data, which is identified as demodulation data corresponding to the selected demodulation step. In stage 4, the FSK demodulator, based on the bit pattern over-sampled N (where N=2 or a larger integer) times the demodulation data output above, decides the generation of DC offset. When a DC offset is generated, the FSK demodulator selects the demodulation step adjacent to the above-selected demodulation step and identifies the adjacent step as the new demodulation step selected for removing DC offset. Below, specific details are discussed below with regard to FIGS. 6 through 14, which provide additional information to enable one of ordinary skill in the art to implement an embodiment of the present invention.

Figure 6:
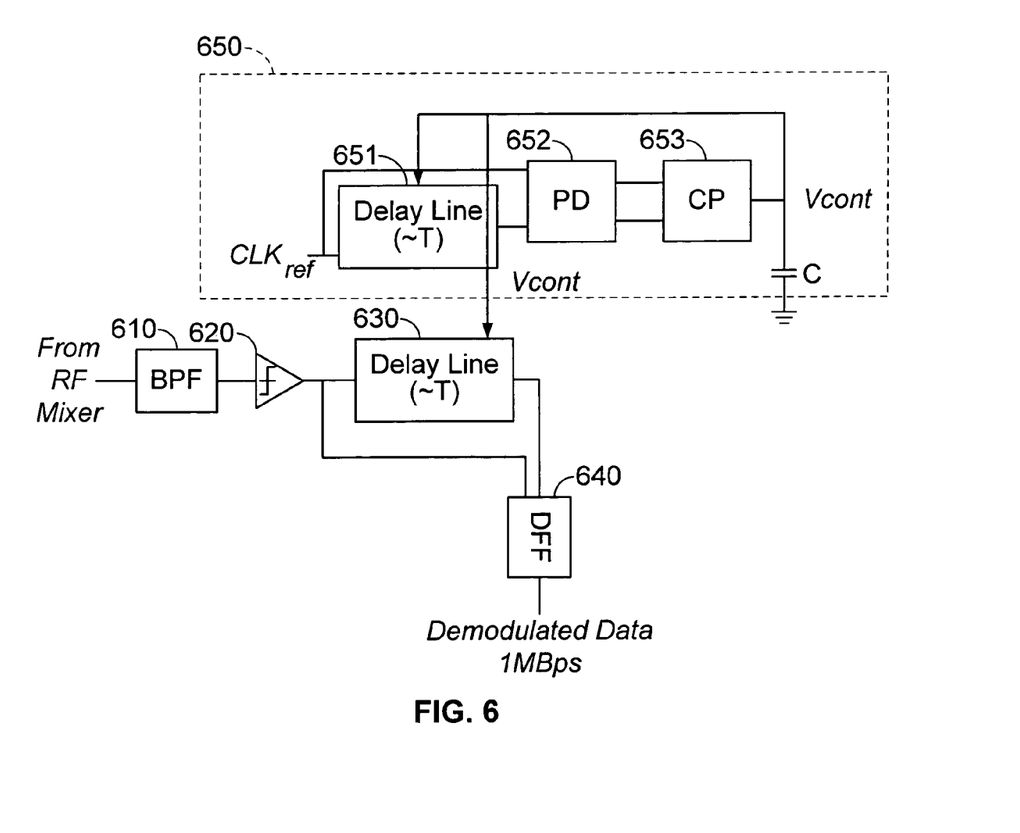
FIG. 6 is a block diagram of an FSK demodulator using DLL and a demodulating method in accordance with an embodiment of the present invention.

FIG. 6 is a block diagram of an FSK demodulator using DLL and a demodulating method in accordance with an embodiment of the present invention. In FIG. 6, an exemplary FSK demodulator in accordance with an embodiment of the present invention includes a band-pass filter (BPF) 610, an amplitude limiter 620, a delay line 630, a delayed flip-flop (DFF) 640, and a DLL circuit 650. The band-pass filter 610 filters a desired channel frequency from output frequencies of an RF mixer of a receiving unit; The amplitude limiter 620 converts the waveform of the filtered frequency into a square wave of the time region. The delay line 630 then receives the square wave from the amplitude limiter 620 and delays the square wave. The delayed flip-flop 640 receives an output signal from the amplitude limiter 620 and an output signal from the delay line 630. Delayed flip-flop then determines which rising edge of the two input signals occurs earlier, and outputs this determination as digital data. The DLL circuit 650 locks the delay time of the delay line 630. The DLL circuit 650 is described in greater detail below.

The DLL circuit 650 includes a delay line 651, a phase detector (PD) 652, a reference clock (CLKref), and a charge pump (CP) 653. The delay line 651 is similar to delay line 630. Delay line 651 delays the output of the input reference clock (CLKref) by the same delay time as that imposed by delay line 630. The phase detector (PD) 652 detects the phases of the output clock from the delay line 651 and the reference clock (CLKref). The charge pump (CP) 653 charges and discharges a capacitor in accordance with the output of the phase detector 652, providing a charged voltage for the capacitor. The charged voltage acts as a simultaneous control signal for the delay time in the delay lines 630 and 651 which enables an accurate lock to the period of the reference clock.

The square wave output of the amplitude limiter 620 is allowed to go through the delay line 630, which is adjusted accurately to the period T of the reference clock. The adjustment is made using the DLL 650 and an edge detector such as DFF 640. The DFF 640 determines whether a rising edge occurs first in the output signal of the amplitude limiter 620 or in the output signal of the delay line 630. The determination of which rising edge occurs first is output as demodulation data in the form of digital data.

Figure 7:
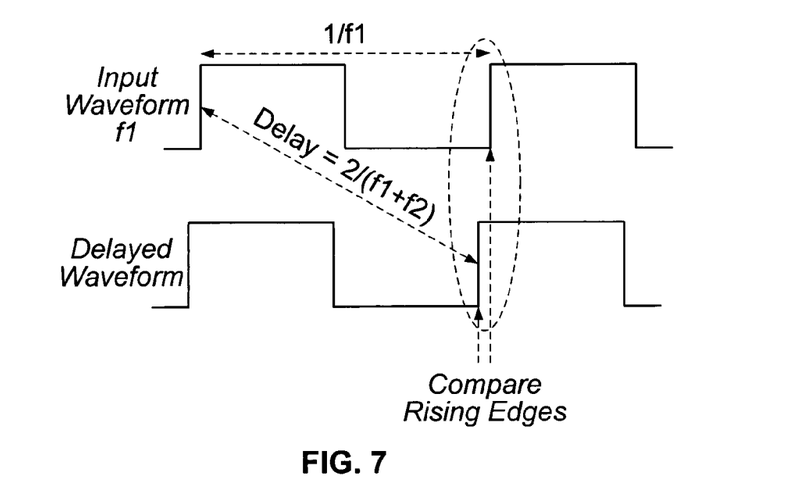
FIG. 7 is a timing diagram of an input waveform received into a delayed flip-flop of an amplitude limiter and a delayed waveform of a delay line, in accordance with an embodiment of the present invention.

FIG. 7 is a timing diagram of an input waveform received into a delayed flip-flop from an amplitude limiter and a delayed waveform of a delay line, in accordance with an embodiment of the present invention. As illustrated, over a single cycle (1/f1), the delay required for the delayed waveform is "delay=2/(f1+f2)." The diagram illustrates the timing of the square wave output from the amplitude limiter 620 and received by the DFF 640. The diagram also illustrates the timing of the delayed square wave from the delay line 630 and comparison of the rising edges of the input square wave and the delayed square wave at a given time.

The example of FIG. 7 illustrates two FSK modulation frequencies, f1 and f2, where f1>f2 and the delay time, T, of the delay line 630 is defined as T=2/(f1+f2), which is set using the DLL 650. If f1 is received while the delay time is set using the above process, then the output from the amplitude limiter 620 forms the next rising edge after a period of 1/f1, and the output from the delay line 630 forms the rising edge after a delay time of 2/(f1+f2). Thus, the rising edge of the output signal from the amplitude limiter appears earlier than the rising edge of the output signal from the delay line 630. Therefore, the DFF 640 outputs demodulation data corresponding to the time order of the rising edges of the output signal from the amplitude limiter 620 and the output signal from the delay line 630. In this example, since the rising edge of the square ware that corresponds to the original signal output from the amplitude limiter 620 occurs earlier than the rising edge of the delayed square wave, "1" is output as demodulation data. The above-described method also applies to the second FSK demodulation frequency, f2.

Figure 8:
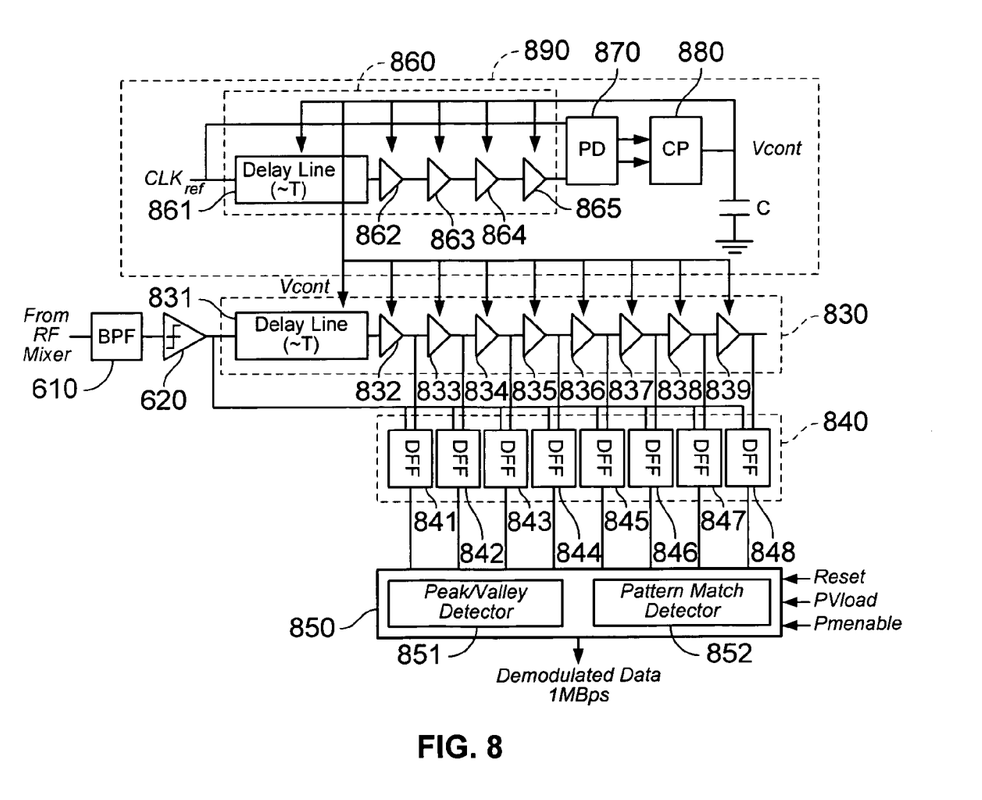
FIG. 8 is a block diagram of an FSK demodulator using DLL in accordance with an embodiment of the present invention.

FIG. 8 illustrates an alternative embodiment with several small delay cells 832–839 and 862–865 which are connected in series to the delay lines 831 and 861, respectively. The delay lines 831 and 861 are similar to the delay lines 630 and 651, enabling fine adjustment of delay time. DFFs 841–848 are multiplied accordingly and a DC offset remover circuit 850 is added.

The FSK demodulator using DLL and a demodulating method embodied in FIG. 8 includes a band-pass filter (BPF) 610, an amplitude limiter 620, similar to the BPF and amplitude limiter in FIG. 6. Also included is a delayer 830 which includes a delay line 831 (which is similar to the delay line 630 of FIG. 6) and 2M ancillary delay cells (where M is an integer) 832–839, which are connected in series to the delay line 831. Further, the FSK demodulator includes a rising edge detection decider 840, DFFs 841–848, a peak/valley detector 851, a pattern match detector 852, a DLL circuit 890 which includes a delayer 860, a delay line 861 (similar to the delay line 651 of FIG. 6), several ancillary delay cells 862–865, an input reference clock (CLKref) for each of the delay cells 862–865, a phase detector (PD) 870, and a delay controller 880.

The band-pass filter 610 filters only a desired channel frequency from the output frequencies of an RF mixer of a receiving unit. The amplitude limiter 620 converts the waveform of the filtered channel frequency into a square wave for a particular time period. The delayer 830 receives square waves from the amplitude limiter 620, and delays the square waves in sequence for a particular time delay for each of the delay cells 831–839. The rising edge detection decider 840 includes multiple DFFs 841–848.

Although FIGS. 6 and 8 depict a particular number of DFFs, fewer or more DFFs can be implemented and are not limited to the quantities shown. Each DFF 841–848 corresponds to an ancillary delay cell 832–839. The ancillary delay cells 832–839 determine, through each of the DFFs 841–848, the time order of the rising edges of the input square wave signal and the output clock signal from each of the ancillary delay cells 832–839 at a given time. Digital data is output from the DFFs 841–848 based on the time order determination described above. On the basis of the digital data, the peak/valley detector 851 selects the DFF that outputs digital data which corresponds to the peak or the valley of the input square wave frequency(s).

The peak/valley detector 851 selects a DFF that outputs digital data which corresponds to the mean of the maximum and minimum of the input square wave frequency(s). The selected DFF is designated as the demodulation DFF for demodulating the input square wave. The demodulation DFF also outputs demodulation data and assists in the determination of DC offset.

The pattern match detector 852 determines and generates an amount of DC offset using the demodulation DFF. The pattern match detector 852 also selects a DFF adjacent to the demodulation DFF and designates the former as a new demodulation DFF and determines and removes a corresponding DC offset. The amount of DC offset is determined based on the bit pattern over-sampled N (where N=2 or another integer) multiplied by the demodulation data output from the peak/valley detector 851.

In order to determine an amount of delay, the DLL circuit 890 delays the output of the input reference clock (CLKref) for each of the delay cells 861–865, in sequence and for a particular period of time. The phase detector (PD) 870 detects the phase difference of the output clock from the delay line 860 and the reference clock (CLKref). Finally, the delay controller 880 provides a delay time control signal (Vcont) which is generated on the basis of the detected phase difference. The delay time control signal (Vcont) provides for the simultaneous control of delay time for each delay cell 861–865 of the delayer 860 and each delay cell 831–839 of the delayer 830 so that the delay time of the delayers 860 and 830 is locked to the period of the input reference clock (CLKref).

With regard to the delay controller 880, a charge pump (CP) 880 enables the charge/discharge of a capacitor (C) in accordance with the output of the phase detector 870 and provides the charged voltage of the capacitor as a simultaneous delay control signal (Vcont) for the delayers 830 and 860.

Figure 9:
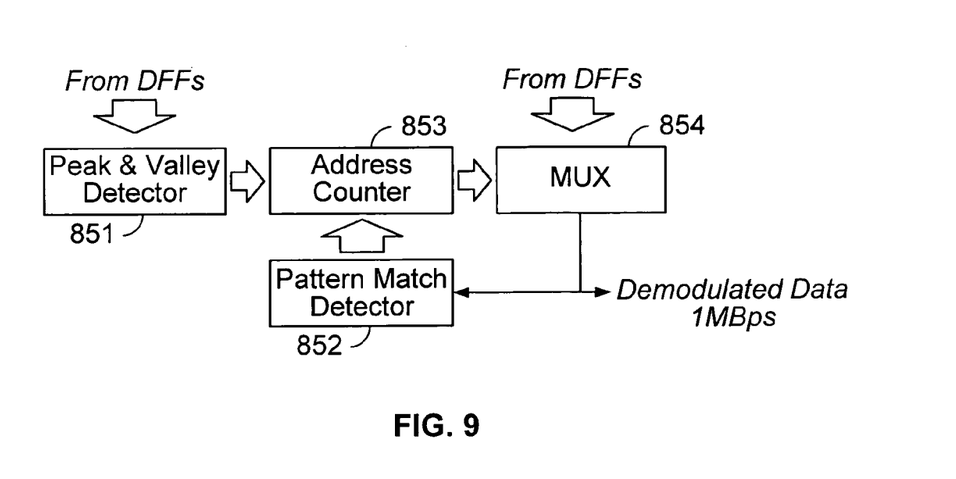
FIG. 9 is a block diagram of the output device of FIG. 8, in accordance with an embodiment of the present invention.

FIG. 9 is a block diagram of the output device 850 of FIG. 8, in accordance with an embodiment of the present invention. One of ordinary skill in the art may envision alternative embodiments of the output device. As illustrated, the output device 850 includes the peak/valley detector 851, the pattern match detector 852, an address counter 853, and a multiplexer (MUX) 854.

The address counter 853 counts the addresses of the demodulation DFFs determined by the peak/valley detector 851 and/or the addresses of the demodulation DFFs, which are determined by the pattern match detector 852. The MUX 854 outputs demodulation data, selected from the output signals of the DFFs 841–848. The demodulation data can be selected based on the counted addresses. The demodulation data also can also serve as the input for the DC offset remover 852.

Figure 10:
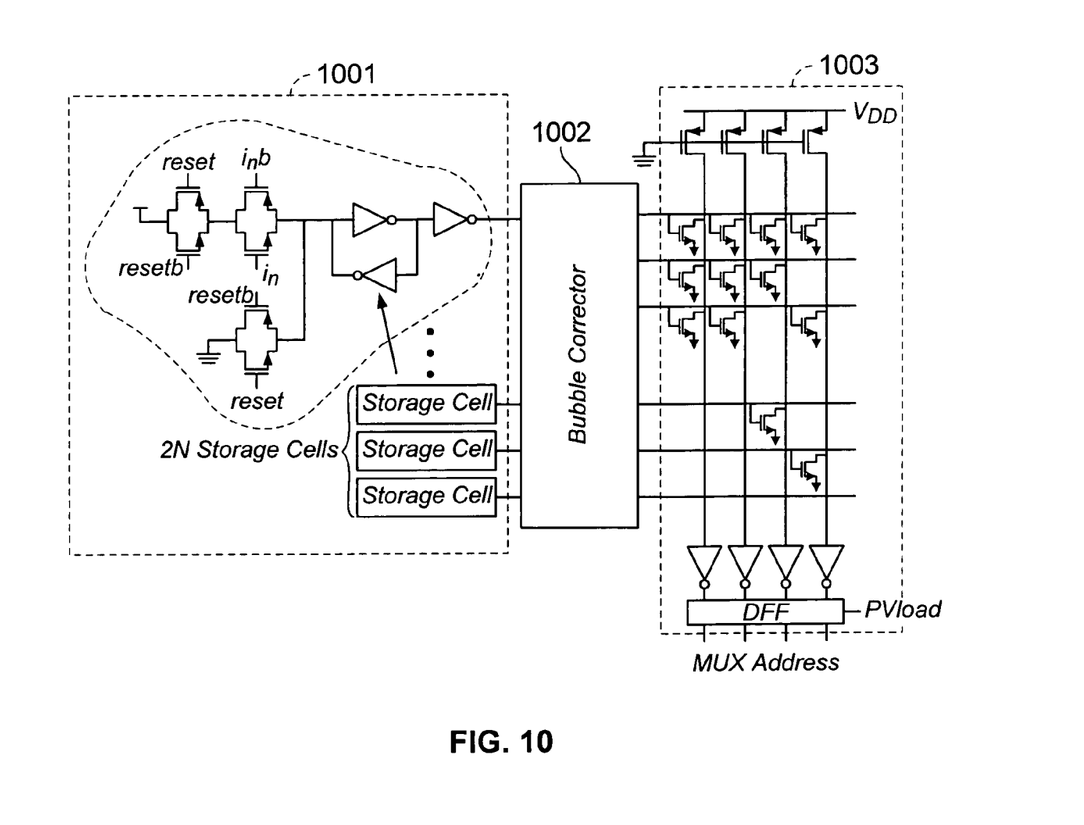
FIG. 10 is a detailed diagram of the peak detector of the peak/valley detector illustrated in FIGS. 8 and 9, in accordance with an embodiment of the present invention.

FIG. 10 is a detailed diagram of the peak detector of the peak/valley detector 851 in FIGS. 8 and 9. As illustrated, the peak detector includes one or more storage cells 1001, a bubble corrector 1002, and an address generator 1003.

Storage cell 1001 relates with the DFFs 841–848 to store output data. The bubble corrector 1002 receives data, which is also stored in the storage cell 1001, corrects any bubble error in the input data, and finds the transition point of the corrected data. The address generator 1003 generates an address, which is sent to the MUX 854. The address is generated based on the output of the bubble corrector 1002.

The storage cell 1001 includes one or more field effect transistors (FET). Storage cells 1001 also have one or more non-inverting inverters to receive reset signals (reset, resetb) and output signals (in, inb) from the DFFs 841–848. Output data from the DFFs 841–848 can also be stored in storage cell 1001.

As discussed above, the address generator 1003 generates an address for the MUX 854. The address generator 1003 includes one or more NMOS FETs where gates and drains can be connected to several matrix lines and voltage sources are grounded. One or more PMOS FETs can be implemented where voltage sources are jointly connected to VDD. Gates of the PMOS FETs can be jointly grounded and drains can be connected to the column lines and a DFF, where the row lines activate by the output of the bubble corrector 1002. The output terminals of the column lines can be connected to the non-inverting inverters and the output of the non-inverting inverter is sent to the address of the MUX 854, in accordance with the control signal (pvload).

Figure 11:
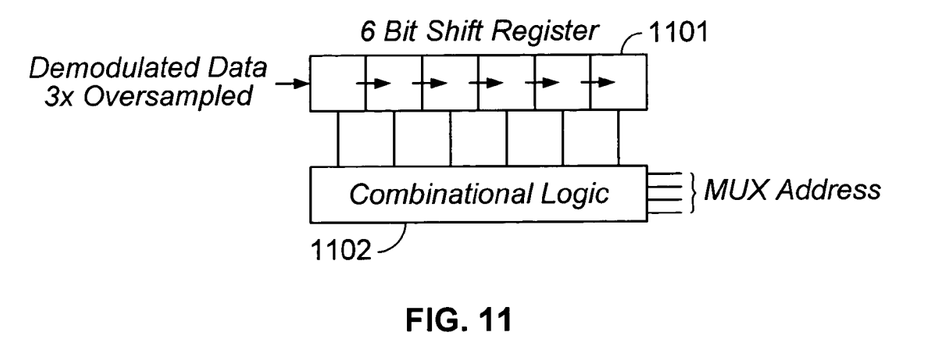
FIG. 11 further illustrates the pattern match detector in FIGS. 8 and 9, in accordance with an embodiment of the present invention.

FIG. 11 further illustrates the pattern match detector 852 in FIG. 8 and FIG. 9. As illustrated, the pattern match detector 852 includes a 6-bit shift register 1101 and a combination logic 1102. The 6-bit shift register 1101 receives data over-sampled 3 times (3×) the demodulation data output from the MUX 854 and imposes a shift by one bit. The combinational logic 1102 receives the data from each bit of the 6-bit shift register 1101, determines the pattern of the input bit, and provides the output based on a determination (e.g., the address of the MUX 854).

Figure 12:
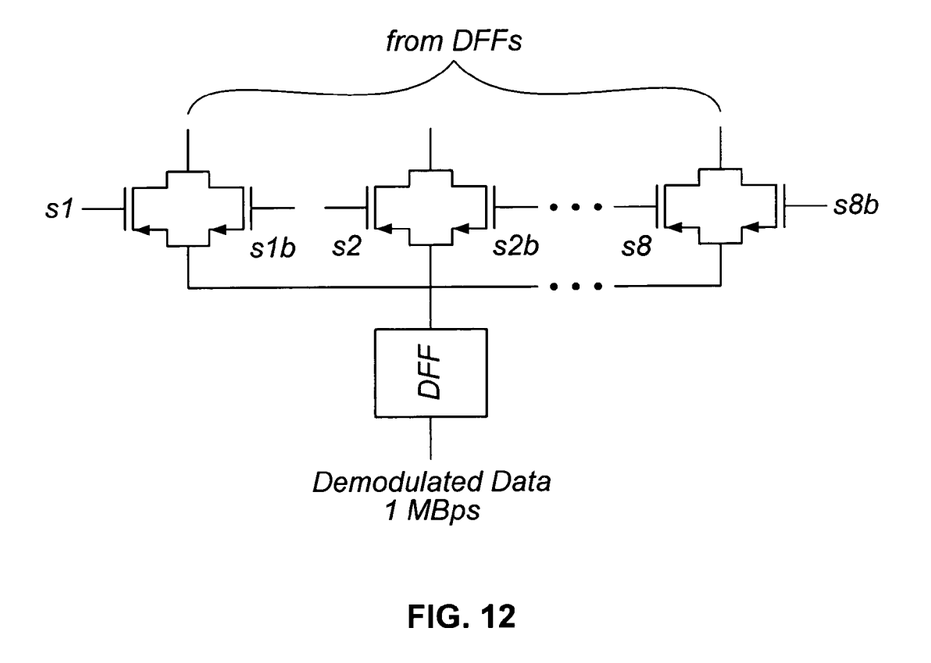
FIG. 12 further illustrates the configuration of the MUX of FIG. 9, in accordance with an embodiment of the present invention.

FIG. 12 illustrates the configuration of the MUX 854 of FIG. 9. As shown, the MUX 854 includes two or more drains and sources jointly connected, in each set. The gates are input with the address data (S1, S2, . . . S8) counted in the address counter 853 and the inverse data of the address data (S1b, S2b, . . . S8b) respectively. The jointly-connected drains receive the output from the DFFs 841–848 as input. The jointly-connected sources are also connected to the DFFs 841–848, which act as buffers, and the demodulation data is transmitted via the output terminal of the DFFs 841–848, as output. Operation of a FSK demodulator using DLL, in accordance with the embodiment shown in FIGS. 8–12 is described below.

The data sequence, assumedly, is repeated with '0' and '1' over a particular period of time. The communication bandwidth (e.g., 3 MHz) and the data rate (e.g., 1 Mbps) are identified in the preamble of the data sequence.

Referring to the embodiment of FIG. 6, the output device 850 includes ancillary delay cells 832–839 and 862–865 which have small delay values to allow fine adjustment of the delay lines 831 and 861. The output device 850 also acts as the main delay cell, as illustrated in FIG. 8. Also included are the peak/valley detector 851 and the pattern match detector 852, which are used to remove the DC offset of FSK demodulation.

Figure 13:
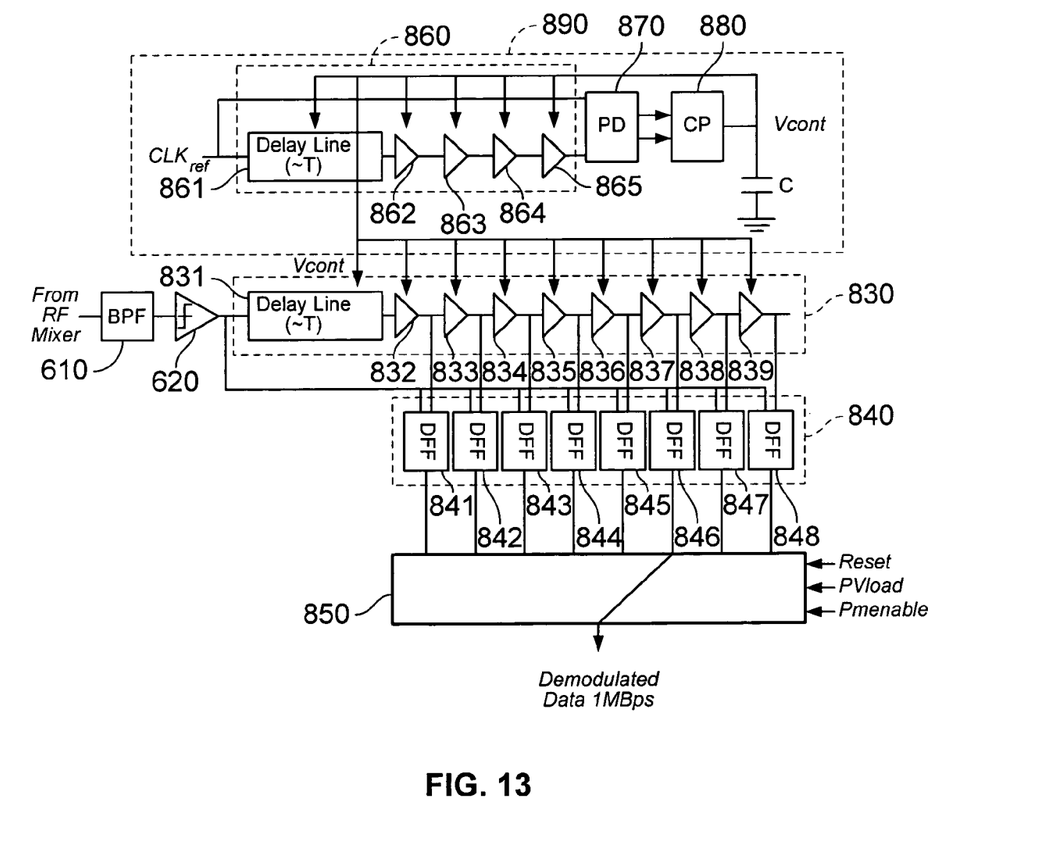
FIG. 13 illustrates the selection of a DFF as a demodulation DFF using the peak/valley detector of the output device of FIG. 9, in accordance with an embodiment of the present invention.

FIG. 13 illustrates the selection of a DFF as the demodulation DFF 846 using the peak/valley detector 851 of the output device 850 of FIG. 9. The peak/valley detector 851 employs a bit pattern over-sampled 3 times (3×) the demodulation data output from the demodulation DFF 846. The bit pattern is detected through the pattern match detector 852 and the DC offset is removed. In other words, by adjusting individual delay times and the delay cells 832–839, the output device 850 can precisely remove the DC offset.

For example, in FIGS. 8 and 9, the output device 850 is divided into two parts: the peak/valley detector 851 (as shown in FIG. 10) and the pattern match detector 852 (as shown in FIG. 12). The peak/valley detector 851, using one of the ancillary delay cells 832–839, determines the delay time in the delayer 830. The peak/valley detector 851 determines which ancillary delay cell corresponds to the maximum or minimum frequency of the output signal of the amplitude limiter 620. The peak/valley detector also determines a corresponding DFF from DFFs 841–848.

As a further example, two input square waves for the FSK modulation frequencies f1 and f2 are assigned as "square wave 1" and "square wave 2." The delay time of the delayer 830 are applied to square wave 1. The delay time for square wave 2 is determined by the fourth and eighth ancillary delay cells 835 and 839, respectively. Subsequently, the corresponding DFFs are the fourth and eighth DFFs 844 and 848, respectively. The FSK demodulation selects the sixth DFF 846 for demodulation. Demodulation DFF 846 receives output data from delay cell 837 where the delay time is defined as "2/f1+f2." The FSK demodulator embodied in FIG. 13 demodulates signals using the demodulation DFF 846.

The peak/valley detector 851 is configured, according to one embodiment in FIG. 10, to select the demodulation DFF 846, as described above. The peak/valley detector operates in such a way that 2 N storage cells 1001 are initialized to "0" at the reset signal of the controller (not shown). When the reset signal is released, each of the storage cells 1001 receives the output from the several DFFs 841–848 to detect whether a "1" is transmitted. If a "1" is detected from any of the output signals of the DFFs 841–848, the storage cell 1001 stores a "1" for a specified period of time (e.g., until the enable control signal (pmenable) from the pattern match detector 852 is sent or until the next reset signal is sent), regardless of whether the signal detected represents a binary "0" or "1."

The bubble corrector 1002 evaluates the data stored in the storage cell 1001 and determines a peak (or valley). For example, in a configuration with eight (8) storage cells 1001, if storage values for the first four storage cells 1001 are "1" and last four storage cells 1001 have a value of "0,", then the delay time of the delayer 830 corresponds to the maximum frequency of the output signal of the amplitude limiter 620, which corresponds to the fourth DFF. In other words, if the output of DFFs 841–848 is represented by the bit sequence "11110000," then the delay time of the delayer 830 corresponds to the maximum frequency of the output signal of the amplitude limiter 620, which corresponds to the fourth DFF 844. The fourth transition in the bit sequence is detected to find the fourth DFF 844.

In contrast, the valley detector 851 detects where the delay time in the delayer 830 occurs. The delay time corresponds to the minimum frequency of the output signal of the amplitude limiter 620. In the above example, if the storage values of all eight storage cells 1001 are "1," (i.e., the output of the DFFs 841–848 is represented by the bit sequence "11111111") then the delay time of the delayer 830 corresponds to the minimum frequency of the output signal of the amplitude limiter 620. Accordingly, the minimum frequency of the output signal of the amplitude limiter 620 corresponds to DFF 848. pAs explained above, the demodulation DFF 846 is determined using the peak/valley detector 851. The FSK modulation signal is demodulated using the demodulation DFF 846. The data is over-sampled 3 times (3×) the demodulation data. The over-sampled data is provided to the 6-bit shift register 1101 of the pattern match detector 852, shown in FIG. 11, and is input incorporating a shift of one bit. The combinational logic 1102 combines three (3) bits of the bit pattern from the 6-bit shift register 1101 and determined whether a "1" or "0" appears three (3) times consecutively to discover the DC offset.

The operational principle of removing DC offset in the pattern match detector 852 is based on the fact that the demodulation data uses three of the same bits in a row (e.g., "111" or "000") when DC offset is completely removed under transmitting conditions of, e.g., a bandwidth of 3 MHz and a data rate of 1 Mbps. Thus, when a bit sequence of "111000111" is demodulated, the bit sequence may be read as "101." However, when a bit sequence of "111001111" is demodulated, the bit sequence presumes that DC offset occurred and the demodulation data may be read as "101." In order to remove the DC offset, a signal is given to the address counter 853 (FIG. 9) in order to change the address of the MUX 854 to, e.g., ±1, so that the fifth or the seventh DFF 845 or 847 adjacent to the sixth DFF 846 can be re-selected as the demodulation DFF.

The output from the peak/valley detector 851 and the pattern match detector 852 determines the address of the MUX 854 (FIG. 12), where the address is used to select a DFF from among the eight DFFs and to fine tune the delay time of the delayer 830 to be exactly "2/(f1+f2)."

Meanwhile, the DC offset may be removed using the peak/valley detector 851 without operating the pattern match detector 852. However, the DC offset may require the storage cells 1001 of the peak/valley detector 851 to be reset periodically. In a preferred embodiment, the output device 850 is divided in such a way that DC offset can be detected by the peak/valley detector 851 during initial stages (e.g., preamble of transmitted data string) and, after the initial stages, by the pattern match detector 852.

Figure 14:
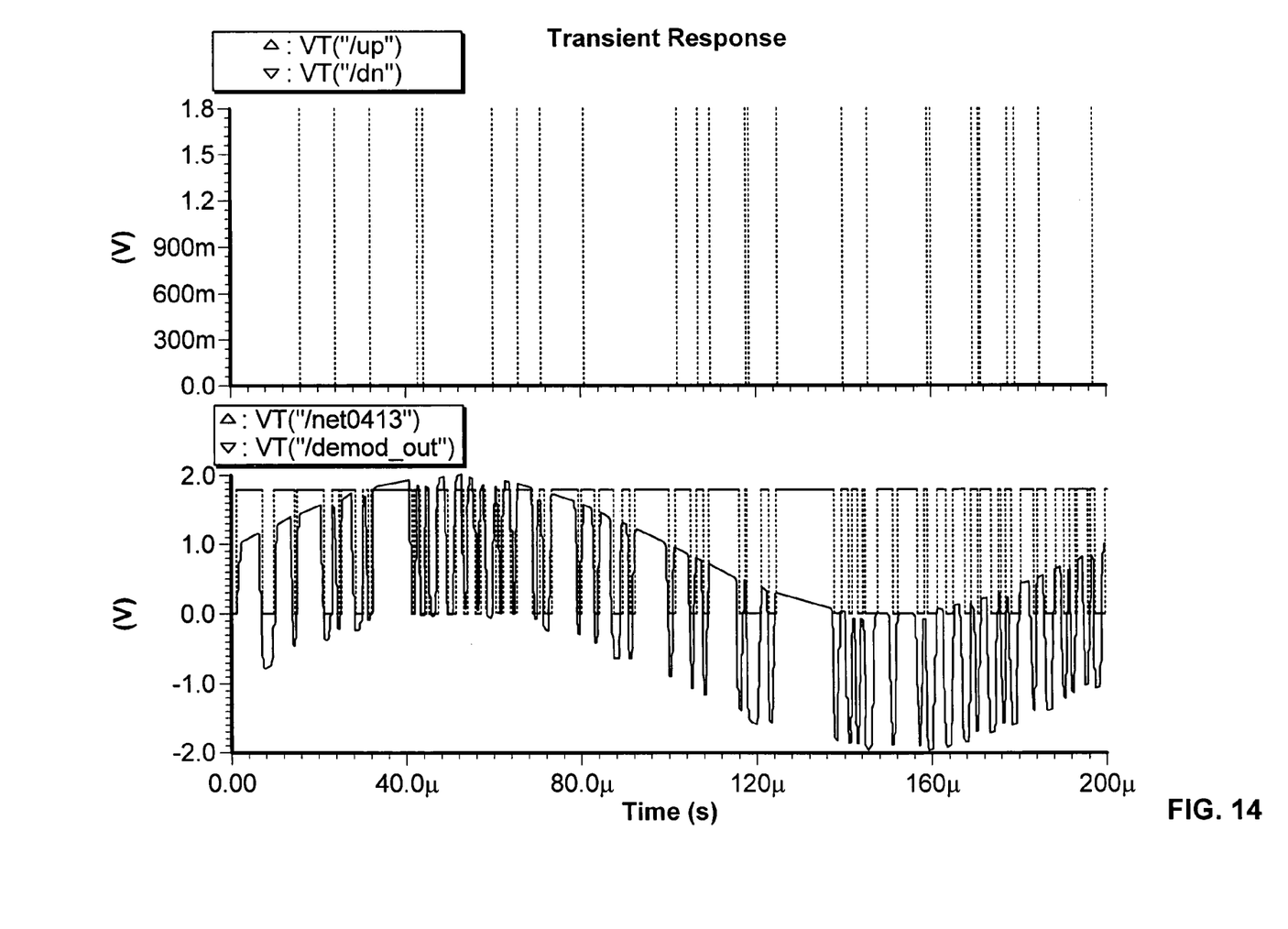
FIG. 14 illustrates the simulated results of an FSK demodulator using DLL and a demodulating method, in accordance with an embodiment of the present invention.

FIG. 14 illustrates the simulated results of an FSK demodulator using DLL and a demodulating method, in accordance with one embodiment of the present invention. In the example shown, digital data is stored while the variable DC offset is removed. The waveforms in the lower graph of FIG. 14 illustrate the input signal having variable DC offset and the demodulated output signal. The waveform in the upper graph of FIG. 14 illustrates pulse signals, which indicate that the pattern match detector 852 of the output device 850 detected the change in the DC offset.

As described in connection with the embodiments above, a FSK demodulator using DLL and a demodulating method effectively and accurately demodulates FSK modulation frequency(s) while removing DC offset.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. An FSK demodulator comprising:
   a delayer configured to delay an input square wave for a delay time, wherein the delayer includes a Delay Locked Loop (DLL) circuit; and
   a demodulator configured to compare a time order of a rising edge of the input square wave and a rising edge of a delayed square wave and to output demodulation data corresponding to a result of comparing the time order.

2. A FSK demodulator as recited in claim 1 wherein the delayer is a first delayer and wherein the Delay Locked Loop (DLL) circuit includes:
- a second delayer configured to delay an output from an input reference clock;
- a phase detector configured to detect a phase of an output clock from the second delayer and a phase of the input reference clock; and
- a charge pump configured to charge or discharge a capacitor based on the phase detector, to provide a charged voltage for controlling the delay time, and to lock the delay time to a period of the input reference clock.

3. A FSK demodulator as recited in claim 1 wherein the demodulator includes a delayed flip-flop.

4. A FSK demodulator as recited in claim 1 wherein the delay time is determined using two or more modulation frequencies.

5. A FSK demodulator comprising:
- a Delay Locked Loop (DLL) circuit having a delayer with a delay cell configured to delay an output of a reference clock;
- a phase detector configured to detect a phase difference between an output clock of the delayer and the reference clock;
- a delay controller configured to provide a delay time control signal;
- a delay line configured to delay an output of an input square wave according to the delay time control signal;
- one or more deciders, each of which corresponds to a delay cell, configured to determine a time order of a rising edge of the input square wave and a rising edge of the output clock and to output data generated in accordance with the time order; and
- an output device that, on the basis of data output from the decider, corresponds data to a maximum or minimum frequency of the input square wave and selects a demodulation decider, corresponding to the mean of the maximum and minimum frequency, configured to demodulate the input square wave and output demodulation data.

6. A FSK demodulator as recited in claim 5 wherein the delay time control signal is generated based on the phase difference and is used to control a delay time of one or more delay cells of the delayer and to lock the delay time to a time period of the reference clock.

7. A FSK demodulator as recited in claim 5 wherein the output device includes a DC offset remover that, based on an over-sampled bit pattern, determines a DC offset and selects a decider adjacent to the demodulation decider for removing the DC offset.

8. A FSK demodulator as recited in claim 5 wherein the output device includes a DC offset remover that, based on an over-sampled bit pattern, determines a DC offset and selects a decider adjacent to the demodulation decider for removing the DC offset wherein the over-sampled bit pattern is determined based on a bandwidth and a rate.

9. A FSK demodulator as recited in claim 5 wherein the delay controller includes a charge pump configured to charge or discharge a capacitor based on the phase detector and to provide a charged voltage as the delay control signal for the delayer and the delay line.

10. A FSK demodulator as recited in claim 5 wherein the decider includes a delayed flip-flop.

11. A method for demodulating a signal comprising:
- receiving an FSK modulation frequency;
- converting the FSK modulation frequency into a square wave;
- delaying the square wave by a delay time to yield a delayed square wave, including locking the delay time based on a period of an input reference clock;
- outputting data based on a time order of a rising edge of the square wave and the delayed square wave; and
- demodulating the square wave into data.

12. A method for demodulating a signal as recited in claim 11 wherein delaying the square wave includes determining the delay time based on two or more modulation frequencies.

13. A method for demodulating a signal as recited in claim 11 further comprises:
- delaying an output of the square wave in sequence by a delay time;
- deciding, at a given time, the time order of the rising edge of the square wave and the delayed square wave;
- outputting data based on deciding, at a given time, the time order;
- evaluating the data to determine a correspondence to a maximum or minimum frequency of the square wave;
- determining a demodulation step, based on evaluating the data, that corresponds to a mean of the maximum and minimum frequency of the square wave, for demodulating the input square wave; and
- outputting demodulation data that corresponds to the demodulation step.

14. A method for demodulating a signal as recited in claim 13 wherein the delay time is locked to a time period delayed by Delay Locked Loop (DLL).

15. A method for demodulating a signal as recited in claim 13 further comprises:
- deciding a DC offset to be generated, based on a bit pattern over-sampled two or more times the demodulation data;
- generating a DC offset for the demodulation step; and
- selecting a step adjacent to the demodulation step as a subsequent demodulation step.

16. A method for demodulating a signal as recited in claim 13 further comprises:
- deciding a DC offset to be generated, based on a bit pattern over-sampled two or more times the demodulation data;
- generating a DC offset for the demodulation step;
- selecting a step adjacent to the demodulation step as a subsequent demodulation step; and
- deciding the DC offset is based on a bandwidth and a data rate.

* * * * *